United States Patent
Nahum et al.

(10) Patent No.: US 9,237,131 B2
(45) Date of Patent: *Jan. 12, 2016

(54) VIRTUAL PRIVATE STORAGE ARRAY SERVICE FOR CLOUD SERVERS

(71) Applicant: Zadara Storage, Ltd., Nesher (IL)

(72) Inventors: Nelson Nahum, Tustin, CA (US); Yair Hershko, Alonei Aba (IL); Yoav Ossia, Haifa (IL); Shyam Kaushik V., Karnataka (IN); Lev Vainblat, Kiriat Yam (IL); Alex Lyakas, Haifa (IL); Moshe Melnikov, Ramat Yishay (IL); Vladimir Popovski, Irvine, CA (US)

(73) Assignee: Zadara Storage, Ltd., Nesher, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/338,292

(22) Filed: Jul. 22, 2014

(65) Prior Publication Data

US 2014/0366121 A1 Dec. 11, 2014

Related U.S. Application Data

(63) Continuation of application No. 13/290,084, filed on Nov. 5, 2011, now Pat. No. 8,819,230.

(51) Int. Cl.
*G06F 15/16* (2006.01)
*H04L 29/06* (2006.01)
(Continued)

(52) U.S. Cl.
CPC .......... *H04L 63/0272* (2013.01); *G06F 3/0607* (2013.01); *G06F 3/067* (2013.01);
(Continued)

(58) Field of Classification Search
CPC . H04L 41/28; H04L 41/5064; H04L 41/2956; H04L 12/5692; H04L 29/06823; H04L 29/08144; G06F 9/455; G06F 3/0601; G06F 3/0604; G06F 3/0629; G06F 3/0631; G06F 3/0662; G06F 3/0665; G06F 3/067
USPC .................................. 709/225–226
See application file for complete search history.

(56) References Cited

U.S. PATENT DOCUMENTS 6,567,889 B1 * 5/2003 DeKoning et al. ............ 711/114
8,166,478 B2 * 4/2012 Jess et al. ...................... 718/1
(Continued)

OTHER PUBLICATIONS

International Search Report and Written Opinion, 8 pages.

*Primary Examiner* — Alina N Boutah
(74) *Attorney, Agent, or Firm* — Patent Law Group LLP; David C Hsia

(57) ABSTRACT

A method for providing virtual private storage array (VPSA) service for cloud users over a computer network includes receiving parameters for the VPSA over the network and creating the VPSA from resources of server computers. Creating the VPSA includes allocating and exposing drives that meets or exceeds specified drive characteristics, drive quantity, and array redundancy criteria to virtual controllers (VCs) in the VPSA, and dedicating parts of processor/memory complexes that each meets or exceeds a specified virtual controller hardware model to the VCs. The VCs run on virtual machines on the dedicated parts of processor/memory complexes on independent server computers. The VCs discover the exposed drives, create a virtual pool from the exposed virtual drives, implement data protection on the virtual pool, create volumes from the virtual pool, expose the volumes over the network to a customer computer, and handle access requests to the volumes from the customer computer.

21 Claims, 9 Drawing Sheets

(51) Int. Cl.
*G06F 3/06* (2006.01)
*G06F 9/455* (2006.01)

(52) U.S. Cl.
CPC ........... *G06F 3/0631* (2013.01); *G06F 3/0665* (2013.01); *G06F 9/45558* (2013.01); *H04L 29/06823* (2013.01); *G06F 2009/45579* (2013.01)

(56) References Cited

U.S. PATENT DOCUMENTS

| | | | |
|---|---|---|---|
| 8,438,654 B1* | 5/2013 | von Eicken et al. | 726/27 |
| 8,799,641 B1* | 8/2014 | Seidenberg et al. | 713/153 |
| 8,805,951 B1* | 8/2014 | Faibish et al. | 709/213 |
| 2005/0193103 A1* | 9/2005 | Drabik | 709/221 |
| 2009/0300719 A1* | 12/2009 | Ferris | 726/3 |
| 2010/0199042 A1* | 8/2010 | Bates et al. | 711/114 |
| 2011/0022812 A1* | 1/2011 | van der Linden et al. | 711/163 |
| 2011/0107103 A1* | 5/2011 | Dehaan et al. | 713/171 |
| 2011/0167469 A1* | 7/2011 | Letca et al. | 726/1 |
| 2011/0173328 A1* | 7/2011 | Park et al. | 709/226 |
| 2011/0179132 A1* | 7/2011 | Mayo et al. | 709/213 |
| 2011/0185355 A1* | 7/2011 | Chawla et al. | 718/1 |
| 2011/0276759 A1* | 11/2011 | Chien et al. | 711/114 |
| 2012/0005724 A1* | 1/2012 | Lee | 726/1 |
| 2012/0078948 A1* | 3/2012 | Darcy | 707/769 |
| 2012/0096149 A1* | 4/2012 | Sunkara et al. | 709/224 |
| 2012/0197624 A1* | 8/2012 | Hawargi et al. | 703/21 |
| 2012/0297381 A1* | 11/2012 | Ambat et al. | 718/1 |
| 2012/0317491 A1* | 12/2012 | Wong et al. | 715/736 |
| 2013/0024432 A1* | 1/2013 | Pendharkar | 707/693 |
| 2013/0086235 A1* | 4/2013 | Ferris | 709/223 |
| 2013/0111471 A1* | 5/2013 | Chandrasekaran | 718/1 |
| 2013/0117448 A1 | 5/2013 | Nahum et al. | |
| 2013/0298122 A1* | 11/2013 | Rangegowda et al. | 718/1 |

* cited by examiner

VIRTUAL PRIVATE STORAGE ARRAY SERVICE FOR CLOUD SERVERS

CROSS-REFERENCE TO RELATED APPLICATIONS

This application claims priority to U.S. application Ser. No. 13/290,084, filed Nov. 5, 2011, entitled "Virtual Private Storage Array Service for Cloud Servers", incorporated herein by reference.

FIELD OF INVENTION

This invention relates to data storage systems, and more particularly to platforms and techniques for provisioning a virtual storage array as a service to users of private and public clouds.

DESCRIPTION OF RELATED ART

Existing data storage arrays are insufficiently elastic in terms of storage and resources provisioning, and they are not multi-tenant and cannot guarantee performance to subsets of the storage system to be able to deploy them in the cloud environments. Moreover, storage arrays cannot be provisioned and provided as a user-controlled service to cloud users. Accordingly, there is a need for elastic virtual storage array that can be built and used as a service while providing the necessary level of data privacy, fault isolation, and predictable performance as traditional storage systems.

SUMMARY

In one or more embodiments of the present disclosure, a method for providing a virtual private storage array (VPSA) as a service over a computer network includes receiving parameters for the VPSA over the network and creating the VPSA from resources of server computers. Creating the VPSA includes allocating and exposing drives that meet or exceed specified drive characteristics, drive quantity, and array redundancy criteria to virtual controllers (VCs) in the VPSA, and dedicating parts of processor/memory complexes that each meets or exceeds a specified virtual controller hardware model to the VCs. The VCs run on virtual machines on the dedicated parts of processor/memory complexes on independent server computers. The VCs discover the exposed drives, creates a virtual pool from the exposed physical drives, implement data protection on the virtual pool, create volumes from the virtual pool, expose the volumes over the network to a customer computer (e.g., customer application servers running in the private or public cloud), and handle access requests to the volumes from the customer computer. Each VPSA has dedicated resources (e.g., central processing units, random access memory, network interface cards, and disk drives) and dedicated management graphic user interface controlled by the user of the cloud. In this manner it is possible to provide consistent performance, security, and control of the storage to every user of the cloud.

BRIEF DESCRIPTION OF THE DRAWINGS

In the drawings.

Use of the same reference numbers in different figures indicates similar or identical elements.

DETAILED DESCRIPTION OF THE INVENTION

Figure 1:
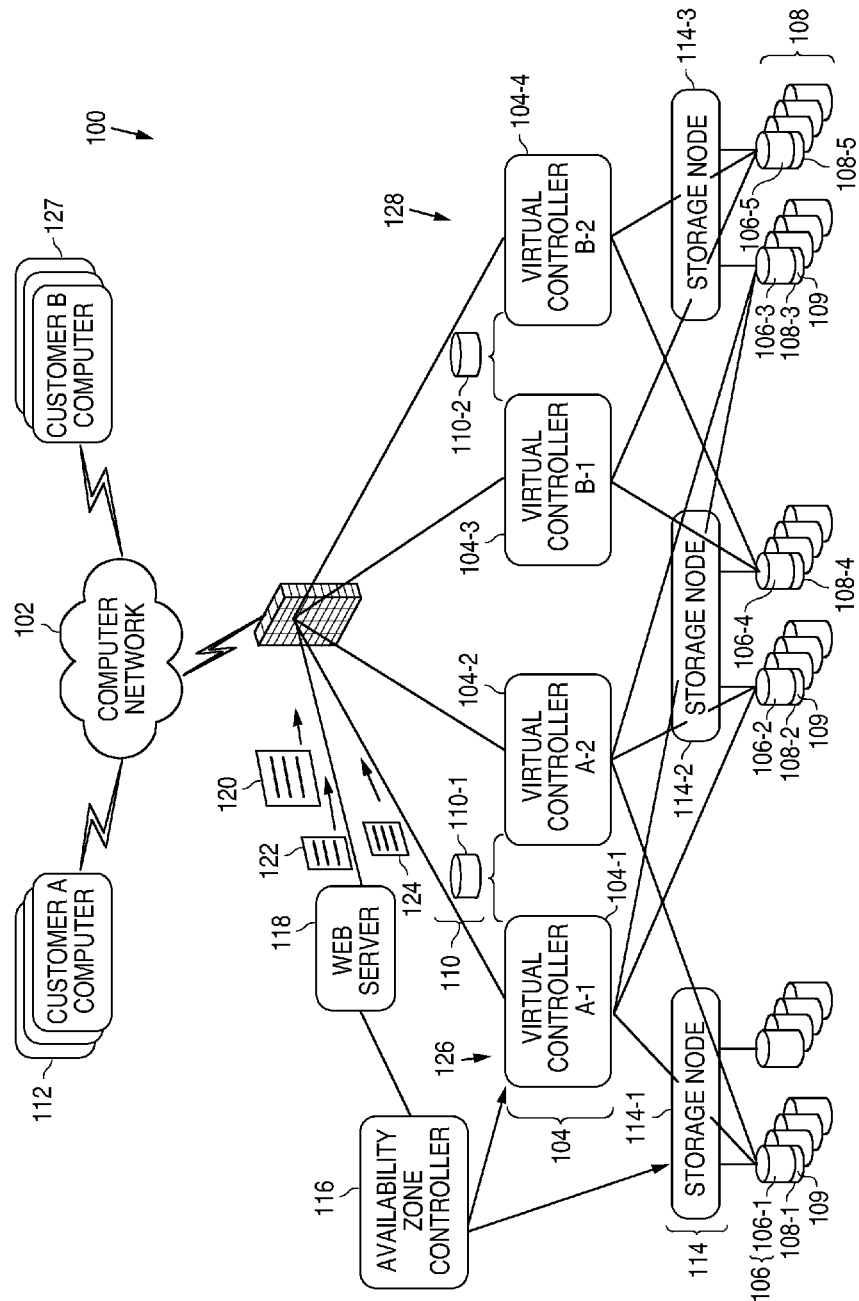
FIG. 1 is a block diagram of an exemplary software system that dynamically provides virtual private storage arrays (VPSAs) as a service in the cloud.

FIG. 1 is a block diagram of an exemplary software system 100 that dynamically provisions and manages virtual private storage arrays (VPSAs) as a service in the cloud in one or more embodiments of the present disclosure. System 100 enables the creation, provisioning, and management of the VPSAs from standard server computers and data storage medium environment. System 100 connects the VPSAs over a computer network 102 to applications running on customer computers, such as cloud servers provided to the customer by another service provider. A cloud server is a virtual server provided as a service by a provider to a customer. While the service provider may offer storage as an additional service, the customer does not have any control over the configuration of the provided storage.

A VPSA is constructed from one or more virtual controllers (VCs) 104 and one or more virtual drives 106 exposed to VCs 104. A virtual drive 106 is a logical volume created from a partition that is an entire physical drive 108 or part of a physical drive 108. VCs 104 and physical drives 108 are distributed among standard server computers that make up an availability zone (AZ).

In a VPSA, VCs 104 are software components responsible for, among other things, creating one or more virtual pools from virtual drives 106, implementing data protection in the virtual pools on virtual drives 106, carving out one or more virtual volumes 110 from the virtual pools with the same data protection provided in the virtual pool, exporting virtual volumes 110 through target drivers to one or more customer computers 112, and handling standard input/output (I/O) requests to virtual volumes 110 from customer computers 112 (e.g., cloud servers). Data protection may be a redundant array of independent disk (RAID) scheme. I/O requests may be Internet small computer system interface (iSCSI) or Infiniband I/O requests. VCs 104 may implement an authentication mechanism to verify authorized I/O access to the VPSA. For example, VCs 104 may verify credentials such as user name and password embedded in the I/O requests. VCs 104 maintain a persistent database of the VPSA's virtual and physical entities, provide a management interface 124 for the VPSA to the customer, and provide monitoring and diagnostic tools for the VPSA to the customer. Using the management interface 124, such as a web form served by VCs 104, the customer can manipulate VPSA storage protection and volume provisioning to cloud servers and applications. Each VC 104 runs in a separate virtual machine (VM) with dedicated memory, processing, and networking resources.

Physical drives 108 may include any combination of hard disk drives (HDDs), solid state drives (SSDs), phase-change memory (PCM) drives, and other types of persistent storage drives. Physical drives 108 are attached to storage nodes (SNs) 114 distributed among the standard server computers in the AZ. SNs 114 are software components responsible for, among other things, querying physical drives 108 for their drive characteristics, grouping physical drives 108 with similar drive characteristics into quality of service (QoS) groups, and reporting drive inventories to an availability zone controller (AZC) 116 (e.g., six drives in QoS group A and two drives in QoS group B). SNs 114 dynamically discover added and removed physical drives 108 and update the AZC 116 with the current drive inventories.

SNs 114 partition physical drives 108 and create virtual drives 106 from the partitions per instructions from AZC 116. As discussed above, a virtual drive 106 is a logical volume created from a partition that is an entire physical drive 108 or part of a physical drive 108. Creating a virtual drive 106 from an entire physical drive 108 offers benefits to cloud users, including full data isolation and privacy on a physical drive basis and the leveraging of physical drives self-encryption capabilities. As VCs 104 and complete physical drives 108 are under the control of a single customer, the customer may use a private encryption key that is not shared with the VPSA service provider or the other customers of the VPSA service provider.

SNs 114 expose virtual drives 106 through target drivers to VCs 104 to allow standard I/O requests (e.g., SCSI or Infiniband) from VCs 104 to virtual drives 106. SNs 114 also create small setup partitions 109 inside each virtual drive. As described later, VCs 104 use setup partitions to store metadata for the VPSA. SNs 114 also collect and maintain I/O metering and error statistics, provide an interface for VCs 104 to query drive characteristics and drive statistics of virtual drives 106, and provide an interface for AZC 116 to query drive inventory, drive characteristics, and drive statistics of physical drives 108.

AZC 116 is the software component responsible for, among other things, creating and placing VCs 104 on the server computers in the AZ based on a service request from the customer. When creating a VPSA, AZC 116 considers various networking topology and resource constrains such as available central processing units (CPUs) and random access memory (RAM) on the server computers, existence of special network interface card (NIC) adapters (such as SR-IOV enabled NICs), and I/O load balancing. AZC 116 also deletes VCs 104 that are no longer needed or paid for. AZC 116 allocates virtual drives 106 from the server computers to meet the service request from the customer. AZC 116 considers the drive characteristics of physical drives 108 and SNs 114 to which physical drives 108 are attached to meet the service request. AZC 116 also configures the networking in the AZ in such a way that VCs 104 can communicate with the relevant SNs 114 for control and data communication, VCs 104 of the same VPSA can communicate with one another for VC-clustering management, and the customers can communicate with VCs 104 for control and data communication, and provide authentication to ensure privacy of access to the VPSAs.

A web server 118 transmits a web form 120 to one of customer computers 112. Web form 120 is configured to pass back parameters of a service request for a new VPSA from the customer. The parameters specify (1) a VC hardware model for each VC in the VPSA, (2) drive characteristics for the VPSA, and (3) a drive quantity for the VPSA. The VC hardware model specifies a CPU model, one or more CPU features, a CPU quantity, a RAM capacity, and a networking bandwidth. The drive characteristics specify a drive type (HDD, SSD, or PCM), a drive capacity, a drive encryption, and a drive interface (e.g., SCSI or InfiniBand). The parameters may further include credentials such as a user name and password for authenticating I/O access to the VPSA, which are later provided by AZC 116 to VCs 104 of the VPSA.

Based on the parameters, web server 118 transmits a web page 122 with the service fee for the VPSA to one of customer computers 112. The service fee may be a cost per unit of time. Web page 122 is configured to pass back a confirmation to create the VPSA from the customer. When web server 118 receives the confirmation, it transmits the parameters to AZC 116.

To illustrate multi-tenancy, system 100 is shown to include a VPSA 126 and a VPSA 128. VPSA 126 includes VCs 104-1, 104-2 and virtual drives 106-1, 106-2, 106-3 generated from physical drives 108-1, 108-2, 108-3. Physical drives 108-1, 108-2, 108-3 are distributed among SNs 114-1, 114-2, and 114-3. VCs 104-1 and 104-2 expose a data volume 110-1 generated from virtual drives 106-1, 106-2, and 106-3 over computer network 102 to customer computers 112.

VPSA 128 includes VCs 104-3, 104-4 and virtual drives 106-4, 106-5 generated from physical drives 108-4, 108-5. Physical drives 108-4 and 108-5 are distributed among SNs 114-2 and 114-3. VCs 104-3 and 104-4 expose a data volume 110-2 generated from virtual drives 106-4 and 106-5 over computer network 102 to customer computers 127.

For redundancy in a VPSA, VCs may be located on different server computers and physical drives may be attached to SNs located on different server computers. However, one server computer may run a VCs and a SN from the same VPSA, and VCs from different VPSAs. To increase performance or reduce costs, the physical drives may be attached to the same SN.

Figure 2:
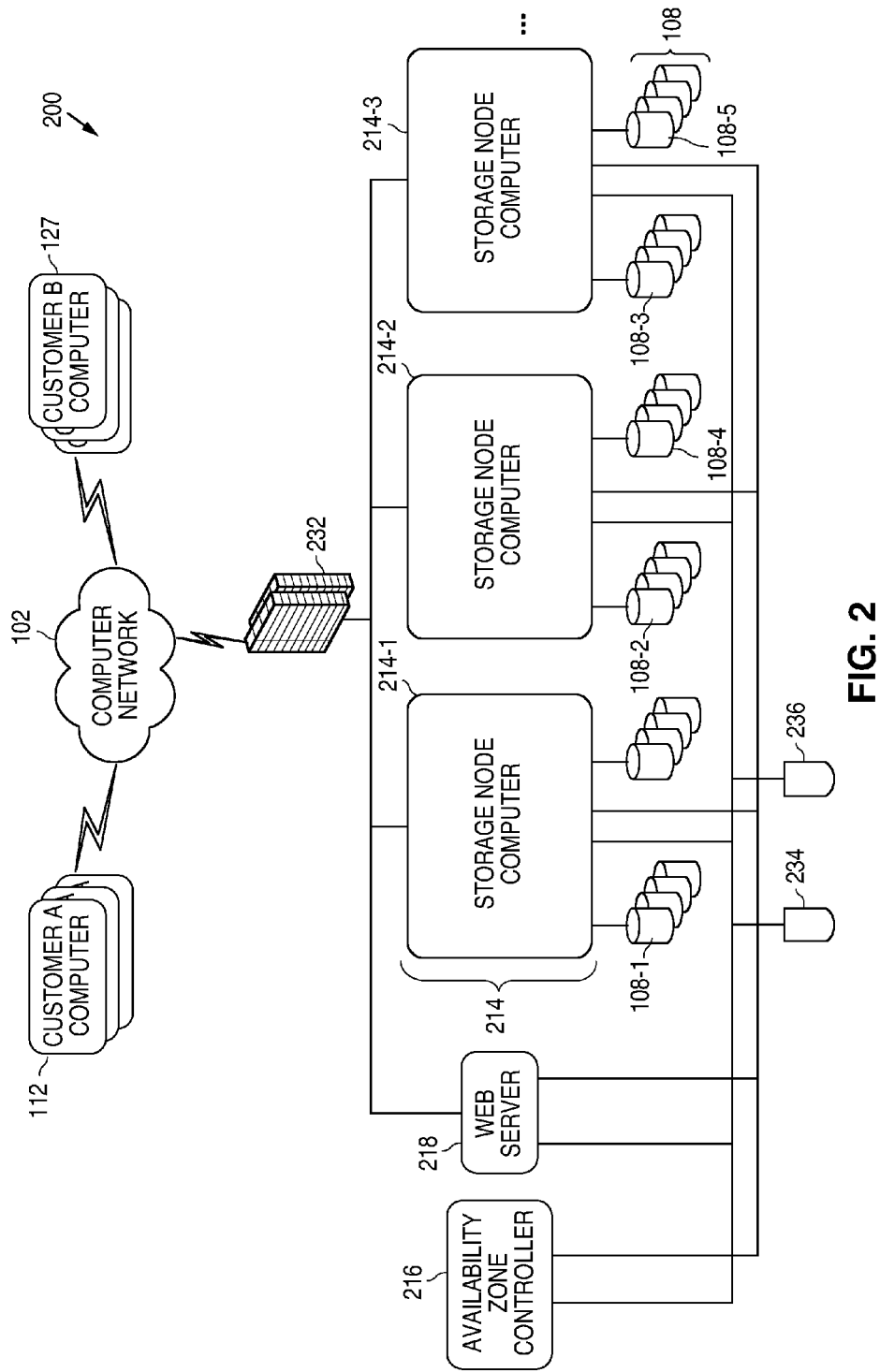
FIG. 2 is a block diagram of an exemplary hardware system for implementing the software system of FIG. 1.

FIG. 2 is a block diagram of an exemplary hardware system 200 for implementing software system 100 (FIG. 1) in one or more embodiments of the present disclosure. In system 200, SNs 114 (FIG. 1) are located on server computers 214 hereafter referred to as "SN computers." VCs 104 are also located on SN computers 214. The number of VCs 104 on a SN computer 214 may be limited to ensure that SN 114 on the SN computer 214 have sufficient hardware resources. System 200 includes SN computers 214-1, 214-2, 214-3, an optional AZC computer 216, and a web server computer 218. SN computers 214-1, 214-2, and 214-3 provide a physical pool of processor/memory complexes, NICs, and physical drives for constructing VPSAs 126 and 128 (FIG. 1). AZC computer 216 executes AZC 116 (FIG. 1) to distribute VCs 104 and virtual drives 106 of the VPSAs among SN computers 214-1, 214-2, and 214-3. For example, VC 104-1 and SN 114-1 (FIG. 1) may be placed on SN computer 214-1 with physical drive 108-1, VCs 104-2, 104-3 and SN 114-2 (FIG. 1) may be placed on SN computer 214-2 with physical drives 108-2 and 108-4, and VC 104-4 and SN 114-3 (FIG. 1) may be placed on SN computer 214-3 with physical drives 108-3 and 108-5. Alternatively, AZC 116 may run on one of SN computers 214-1, 214-2, and 214-3 instead of a dedicated AZC computer 216.

Web server computer 218 executes web server 118 (FIG. 1) to create web form 120 and web page 122. SN computers 214 and web server 218 are connected by one or more public switches 232 to computer network 102. SN computers 214, AZC computer 216, and web server 218 are connected by one or more private switches 234 and 236 to each other.

Figure 3:
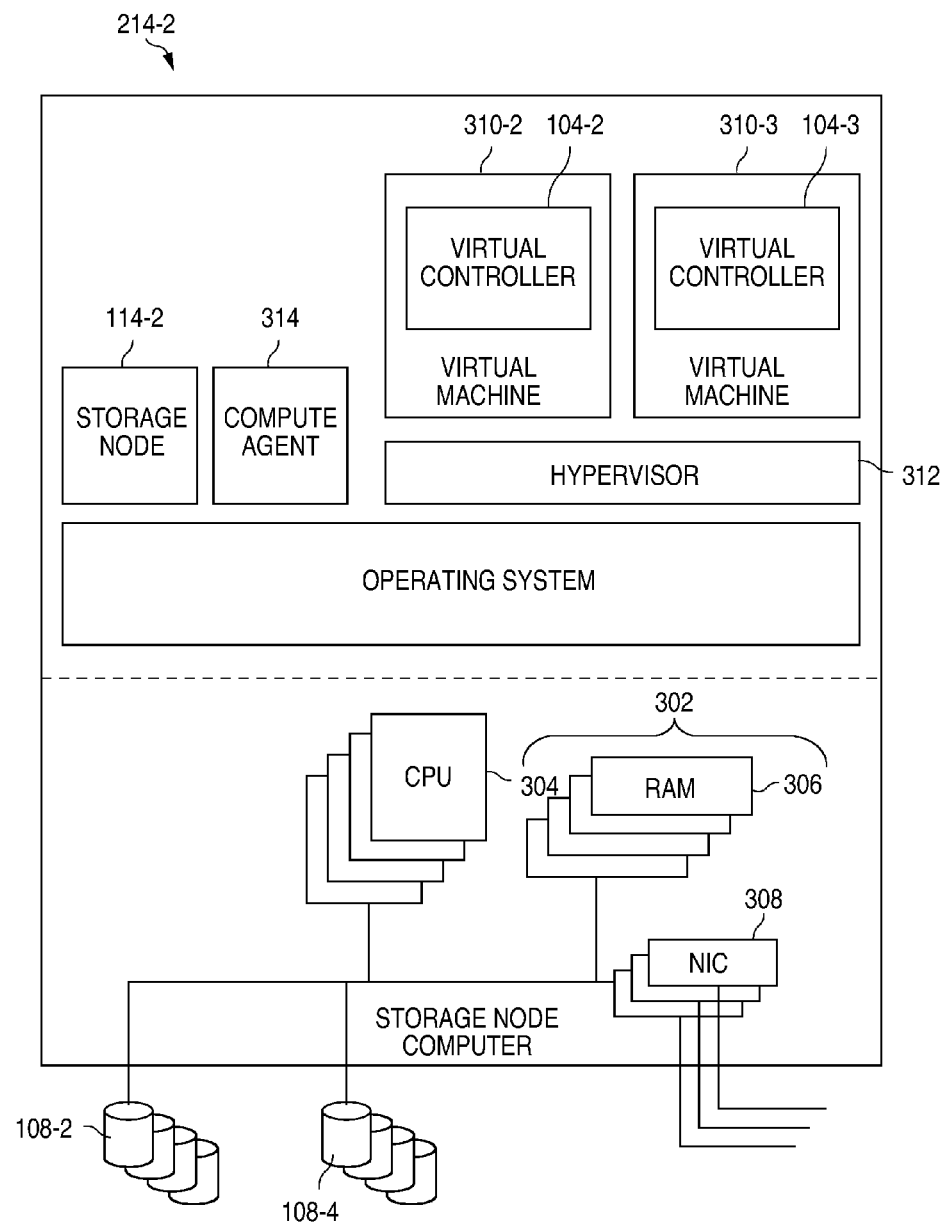
FIG. 3 is a block diagram of an exemplary storage node computer in FIG. 2.

FIG. 3 is a block diagram of an exemplary SN computer 214-2 in one or more embodiments of the present disclosure. The hardware of SN computer 214-2 includes a processor/memory complex 302 with CPUs 304 and RAM 306, NICs 308, and physical drives 108-2 and 108-4. The software of SN computer 214-2 includes SN 114-2 and VCs 104-2, 104-3 running on VMs 310-2, 310-3, which in turn run on a hypervisor 312. VMs 310-2 and 310-3 have virtual CPUs, RAMs, and NICs created from dedicated and/or shared hardware of SN computer 214-2. The software of SN computer 214-2 further includes a compute agent 314 that spawns VMs 310-2 and 310-3 with dedicated CPUs, RAM, and NICs, and starts VCs 104-2, 104-3 on VMs 310-2, VMs 310-3. For example, compute agent 314 may create a VM with virtual CPU and RAM created from dedicated CPU and RAM but a virtual NIC (VNIC) created with a portion of the available network bandwidth from a NIC.

Figure 4:
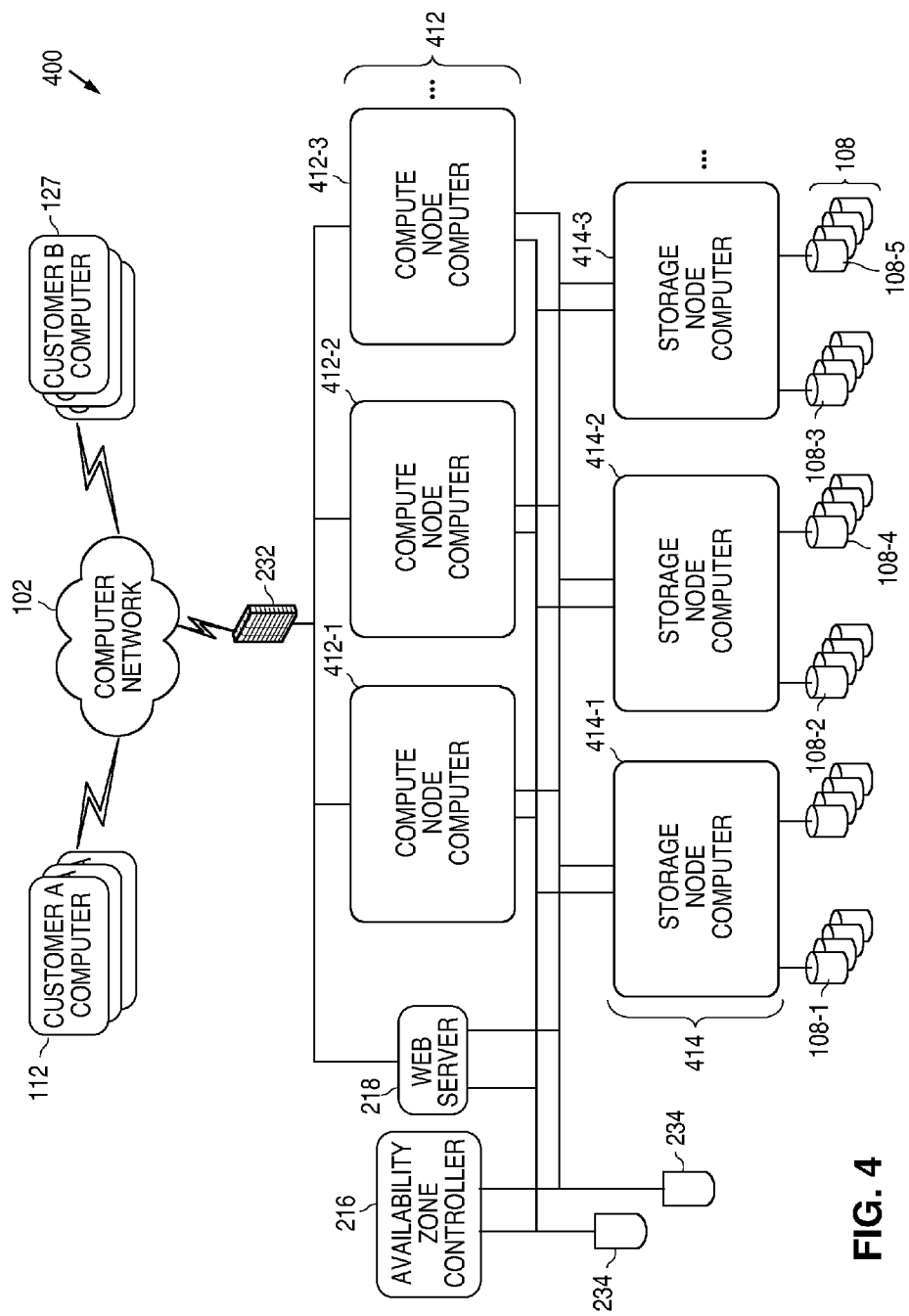
FIG. 4 is a block diagram of an exemplary alternative hardware system for implementing the software system of FIG. 1.

FIG. 4 is a block diagram of an exemplary alternative hardware system 400 for implementing software system 100 (FIG. 1) in one or more embodiments of the present disclosure. In system 400, VCs 104 (FIG. 1) are located on server computers hereafter referred to as "compute node computers" or "CN computers" 412, and SNs 114 (FIG. 1) are located on SN computers 414. System 400 includes CN computers 412-1, 412-2, 412-3, SN computers 414-1, 414-2, 414-3, optional AZC computer 216, and web server computer 218.

CN computers 412 provide a physical pool of processor/memory complexes and NICs for implementing VCs 104, and SN computers 414 provide a physical pool of physical drives 108. For example, VC 104-1 (FIG. 1) is placed on CN computer 412-1, VCs 104-2, 104-3 (FIG. 1) are placed on CN computer 412-2, and VC 104-4 (FIG. 1) is placed on CN computer 412-3. SN 114-1 (FIG. 1) is placed on SN computer 414-1 with physical drive 108-1, SN 114-2 (FIG. 1) is placed on SN computer 414-2 with physical drives 108-2 and 108-4, and SN 114-3 (FIG. 1) is placed on SN computer 414-3 with physical drives 108-3 and 108-5.

Each CN computer 412 may be implemented like SN computer 214-2 in FIG. 3 but without storage node 114-2 and a different number of VCs 104. Each SN computer 414 may be implemented like SN computer 214-2 but without VCs 104, compute agent 314, and hypervisor 312 (FIG. 3).

CN computers 412 and web server 218 are connected by one or more public switches 232 to computer network 102. CN computers 412, SN computers 414, AZC computer 216, and web server 218 are connected by one or more private switches 234 to each other.

Figure 5:
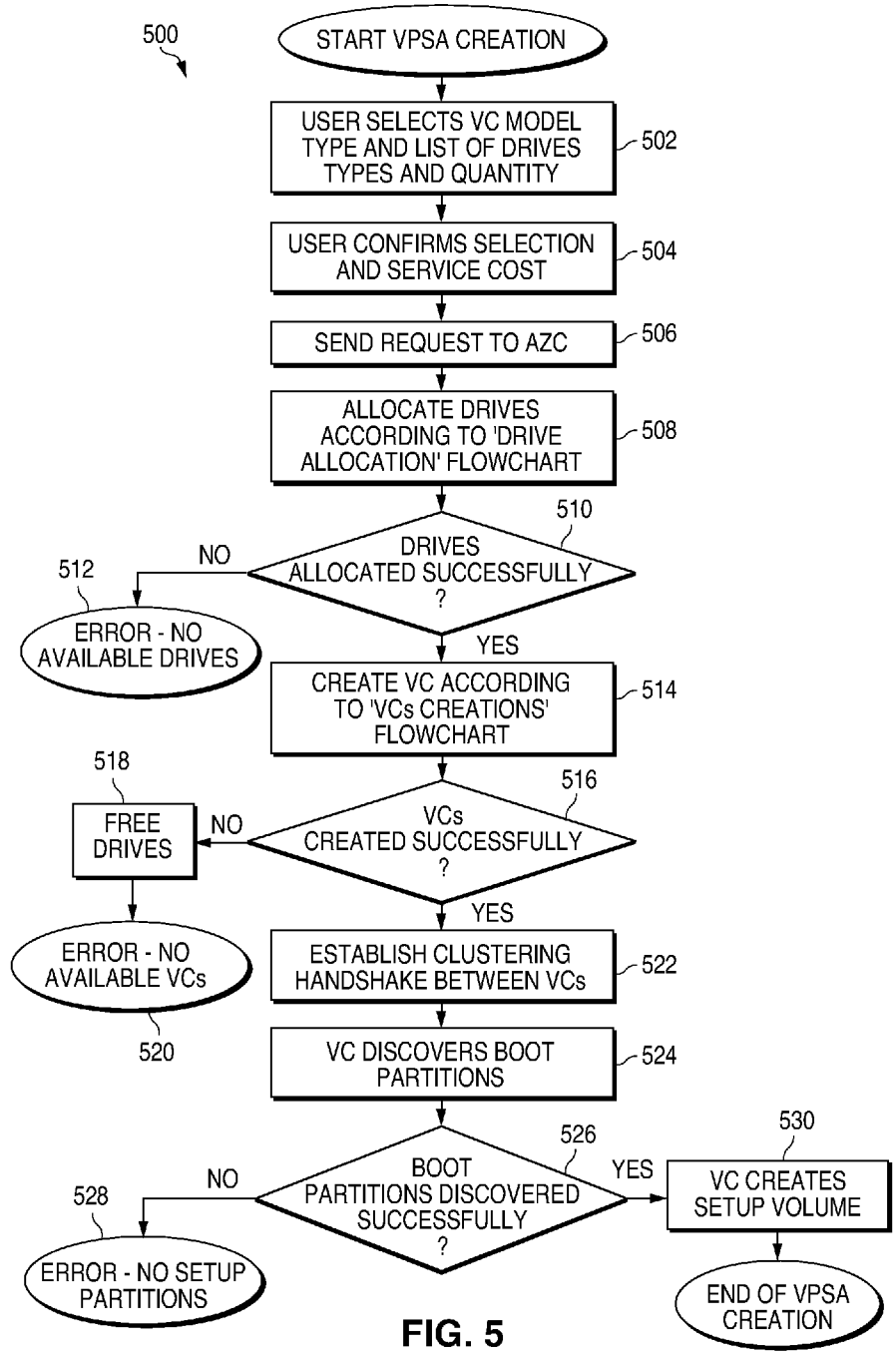
FIG. 5 is a flowchart of an exemplary method for the system of FIG. 1 to spawn a new VPSA.

FIG. 5 is a flowchart of a method 500 for system 100 to spawn a new VPSA in one or more embodiments of the present disclosure. Method 500, and other methods described herein, may include one or more operations, functions, or actions illustrated by one or more blocks. Although the blocks are illustrated in a sequential order, these blocks may also be performed in parallel, and/or in a different order than those described herein. Also, the various blocks may be combined into fewer blocks, divided into additional blocks, and/or eliminated based upon the desired implementation. Method 500 may start in a block 502.

In block 502, web server 118 transmits web form 120 to customer computer 112 to allow the customer to provide parameters for the VPSA. As discussed before, the parameters specify (1) a VC hardware model for each VC in the VPSA, (2) drive characteristics for the VPSA, and (3) a drive quantity for the VPSA. The parameters may further include credentials for authenticating I/O access to the VPSA. The parameters are passed back to web server 118. Block 502 may be followed by block 504.

In block 504, web server 118 transmits web page 122 with the fee for the VPSA to customer computer 112. For the purposes of explaining method 500, assume a confirmation to create the VPSA is passed back to web server 118. Block 504 may be followed by block 506.

In block 506, web server 118 sends the service request and the parameters for the VPSA to AZC 116. Block 506 may be followed by block 508.

In block 508, system 100 allocates virtual drives 106 to placeholders for the yet-to-be-created VCs 104 in the VPSA. Block 508 is implemented with a method 600 of FIGS. 6A and 6B explained later in detail. Block 508 may be followed by a block 510.

In block 510, AZC 116 determines if virtual drives 106 have been allocated successfully to the VPSA. If no, block 510 may be followed by block 512. If physical drives 108 have been allocated successfully, block 510 may be followed by block 514.

In block 512, AZC 116 determines an error has occurred as there are insufficient virtual drives 106 that meet the drive requirements of the VPSA. AZC 116 may cause web server 118 to send an error message to customer computer 112 and end method 500.

In block 514, system 100 creates VCs 104 for the VPSA according to a method 700 of FIGS. 7A and 7B explained later in detail. Block 514 may be followed by a block 516.

In block 516, AZC 116 determines if VCs 104 in the VPSA have been created successfully. If no, block 516 may be followed by block 518. If VCs 104 in the VPSA have been created successfully, block 516 may be followed by block 522.

In block 518, AZC 116 frees virtual drives 106 previously allocated to the VPSA in block 508. Block 518 may be followed by block 520.

In block 520, AZC 116 determines an error has occurred as there are insufficient VCs 104 with the specified VC hardware model for the VPSA. AZC 116 may cause web server 118 to send an error message to customer computer 112 and end method 500.

In block 522, VCs 104 establish clustering handshakes with each other to establish the roles of the VCs. For example, one VC 104 may act as a primary while another VC 104 may be on standby, or both VCs may actively load-share. Block 522 may be followed by block 524.

In block 524, VCs 104 attempt to discover setup partitions created by SNs 114 from virtual drives 106. As described above, setup partitions are used by VCs 104 to create a setup volume to store VPSA system information and metadata. Block 524 may be followed by block 526.

In block 526, VCs 104 determine they have discovered the setup partitions. If no, block 526 may be followed by block 528. If VCs 104 have discovered the setup partitions, then block 526 may be followed by block 530.

In block 528, VC 104 notifies AZC 116 that an error has occurred. AZC 116 may cause web server 118 to send an error message to customer computer 112 and end method 500.

In block 530, VCs 104 create a protected setup volume from a redundant set of its setup partitions The setup volume is used to provide persistent storage of any VPSA system data, including but not limited to physical and virtual objects metadata, metering statistics, and logging and tracing.

Figure 6A:
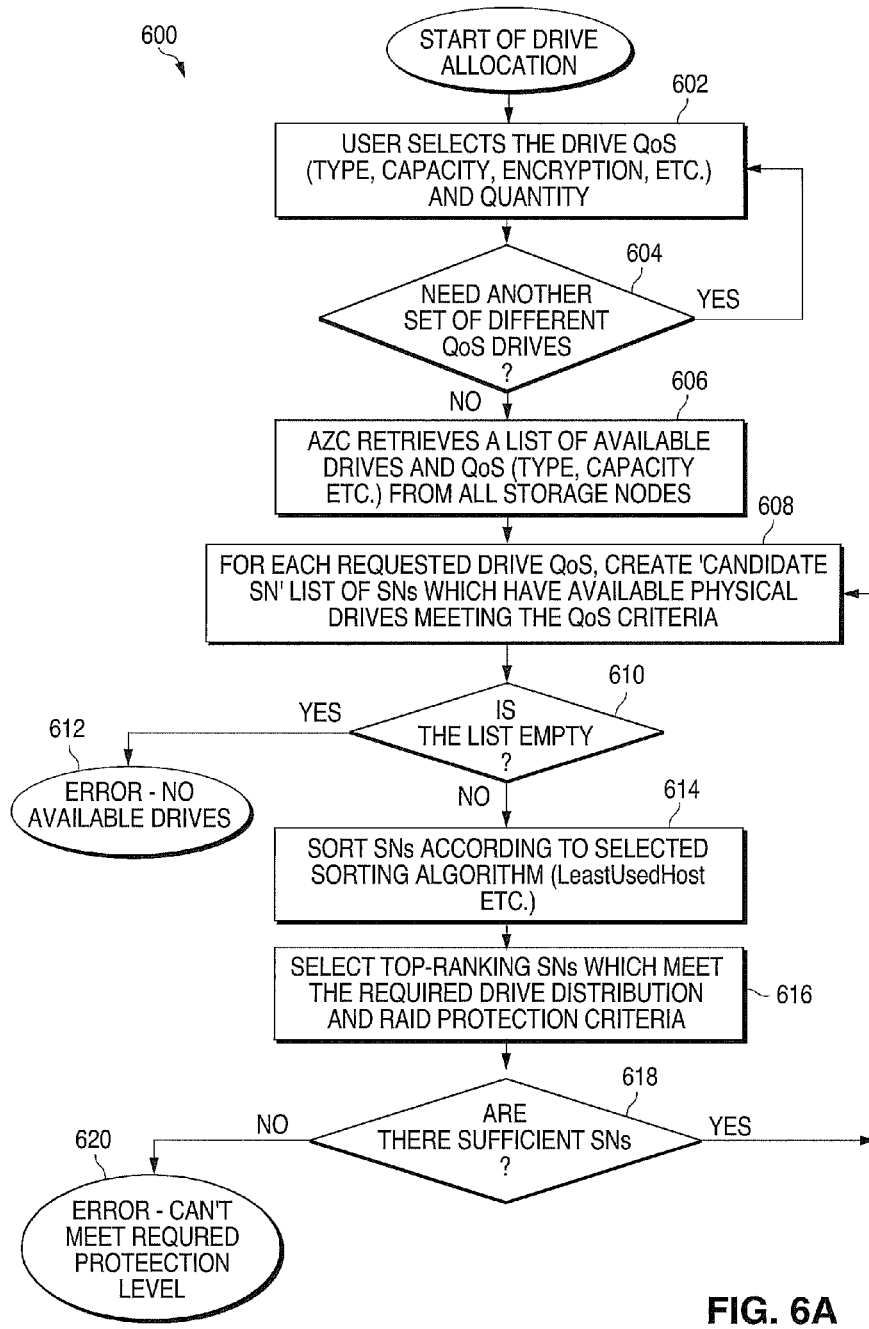
FIGS. 6A and 6B show a flowchart of an exemplary method for the system of FIG. 1 to allocate virtual drives to virtual controllers (VCs) in the VPSA.
Figure 6B:
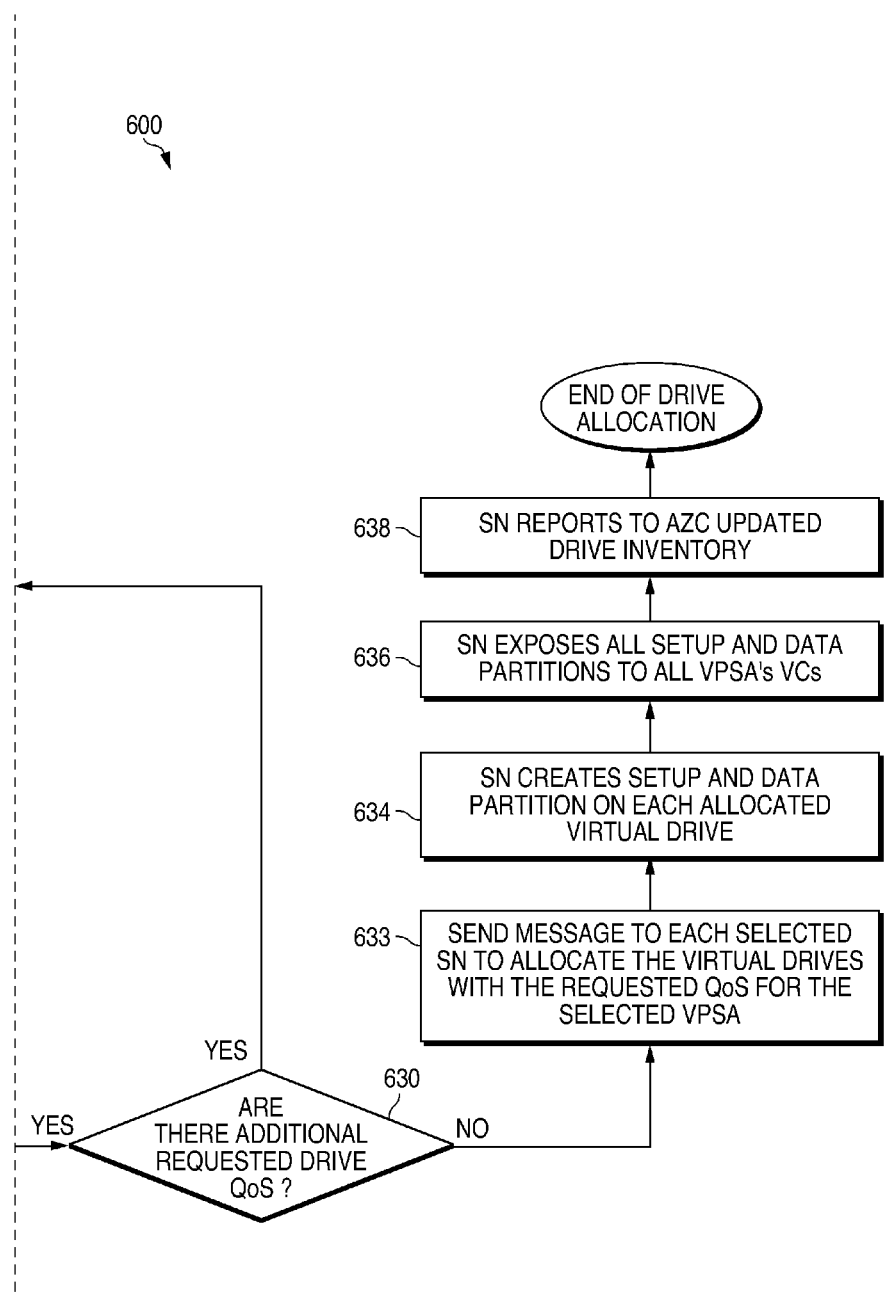

FIGS. 6A and 6B show a flowchart of an exemplary method 600 for system 100 to allocate virtual drives 106 to VCs 104 in the VPSA in one or more embodiments of the present disclosure. Method 600 may begin in a block 602.

In block 602, web server 118 transmits web form 120 to customer computer 112 to allow the customer to provide parameters for the VPSA. As discussed before, the parameters include drive characteristics and a drive quantity of a set of virtual drives 106 for the VPSA. The drive characteristics specify a drive type, a drive capacity, and a drive encryption.

The parameters are passed back to web server 118. Block 602 may be followed by block 604.

In block 604, web form 120 is configured to determine if the customer wishes to add another set of virtual drives 106. For example, web form 120 includes an "add more drives" button that the customer selects to add another set of virtual drives 106. If the customer wishes to add another set of virtual drives 106, block 604 may loop back to block 602. Otherwise block 604 may be followed by block 606.

In block 606, AZC 116 retrieves a list of available physical drives 108 and their drive characteristics from all VCs 104. This list is generated from the drive inventories reported by SNs 114. Block 606 may be followed by block 608.

Block 608 is the start of a loop through all the requested drive types. For each requested set of virtual drives 106, AZC 116 creates a candidate SN list of SNs 114 that have available physical drives 108 that meet or exceed the drive characteristics specified for the requested set. Block 608 may be followed by block 610.

In block 610, AZC 116 determines if the candidate SN list is empty. If so, block 610 may be followed by block 612. Otherwise block 610 may be followed by block 614.

In block 612, AZC 116 determines an error has occurred as there are no available physical drives 108. AZC 116 may cause web server 118 to send an error message to customer computer 112 and end method 600.

In block 614, AZC 116 sorts the candidate SN list according to one or more sorting criteria. Sorting criteria may be the utilization rates of the underlying server computers. Block 614 may be followed by block 616.

In block 616, AZC 116 selects top ranking SNs in the candidate SN list that meet one or more drive distribution and RAID protection criteria. For example, a 2-way RAID-1 may require 2 SNs while RAID-5 may require distribution among as many SNs as possible. Block 616 may be followed by block 618.

In block 618, AZC 116 determines if there are sufficient SNs. If no, then block 618 may be followed by block 620. Otherwise block 618 may be followed by block 630.

In block 630, AZC 116 determines if one or more additional requested sets of virtual drives 106 remain in the loop. If so, block 630 may loop back to block 608 to create a new candidate SN list for a new requested set and repeat the above described process. Otherwise block 630 may be followed by block 632.

In block 632, AZC 116 sends a message to each selected SN 114 in the selected SN list to allocate virtual drives 106 that meet or exceed the drive characteristics and drive quantity to the VPSA. Block 632 may be followed by block 634.

In block 634, the selected SNs 114 create a setup partition and a data partition on each virtual drive 106. As described above, setup partitions are used by VCs 104 to create a setup volume to store VPSA system information and metadata. Block 634 may be followed by block 636.

In block 636, the selected SNs 114 expose the setup and the data partitions to VCs 104 of the VPSA. Block 636 may be followed by block 638.

In block 638, the selected SNs 114 report updated drive inventory to AZC 116 and ends method 600.

Figure 7A:
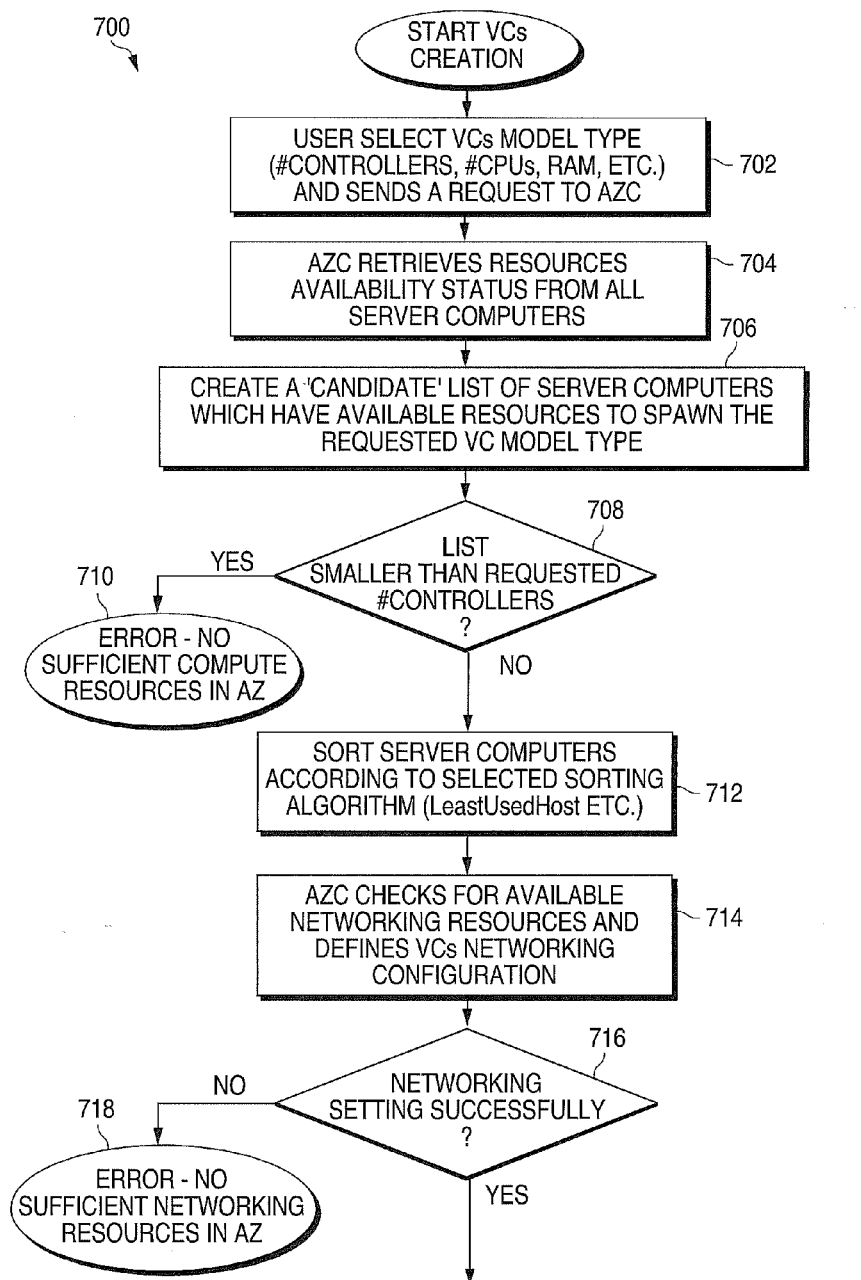
FIGS. 7A and 7B show a flowchart of an exemplary method for the system of FIG. 1 to create the VCs in the VPSA, all arranged according to embodiments of the present disclosure.
Figure 7B:
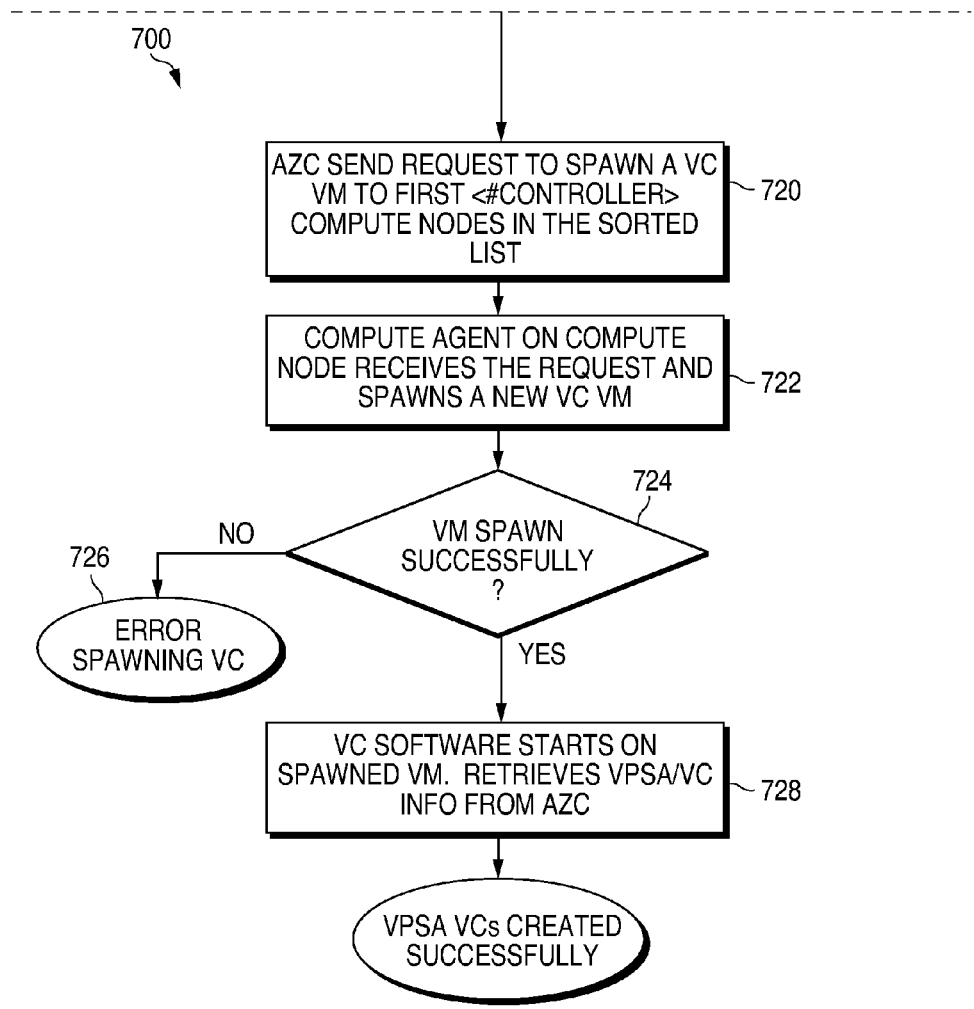

FIGS. 7A and 7B show a flowchart of an exemplary method 700 for system 100 to create the VCs in the VPSA in one or more embodiments of the present disclosure. Method 700 may start with block 702.

In block 702, web server 118 transmits web form 120 to customer computer 112 to allow the customer to provide parameters for the VPSA. As discussed above, the parameters include a VC hardware model for each VC in the VPSA and credentials for authenticating I/O access to the VPSA. The VC hardware model specifies a CPU model, one or more CPU features, a CPU quantity, a RAM capacity, and a networking bandwidth. The parameters are passed back to web server 118, which transmits them to AZC 116. Block 702 may be followed by block 704.

In block 704, AZC 116 retrieves availability status of CPUs, memory, and network bandwidth of NICs from compute agents 314 on all server computers. Block 704 may be followed by block 706.

In block 706, AZC 116 creates a candidate server computer list of server computers in the AZ that have available processor/memory complexes and NICs with available network bandwidths that meet or exceed the specified VC hardware model. Block 706 may be followed by block 708.

In block 708, AZC 116 determines if the candidate server computer list is smaller than the requested number of VCs 104. If so, then block 708 may be followed by block 710. Otherwise block 708 may be followed by block 712.

In block 710, AZC 116 determines an error has occurred as there are insufficient processor/memory complexes and NICs that meet or exceed the requested VC hardware model. AZC 116 may cause web server 118 to send an error message to customer computer 112 and end method 700.

In block 712, AZC 116 sorts the candidate server computer list according to one or more sorting criteria. Sorting criteria may be utilization rates of the server computers. Block 712 may be followed by block 714.

In block 714, AZC 116 checks the available networking resources and defines VC networking configuration. From a range of available public IP addresses, AZC 116 allocates public IP addresses to the VNICs of VCs 104 for communication with customer computers 112. From a range of available private IP addresses, AZC 116 allocates private IP addresses to the VNICs of VCs 104 for communication between coupling VCs and between VCs and SNs. Block 714 may be followed by block 716.

In block 716, AZC 116 determines if networking configuration has been set successfully because there are sufficient public and/or IP addresses to allocate to VCs 104 and SNs 114. If no, then block 716 may be followed by block 718. Otherwise block 716 may be followed by block 720.

In block 718, AZC 116 determines an error has occurred as there are insufficient public and/or private IP addresses. AZC 116 may cause web server 118 to send an error message to customer computer 112 and end method 700.

In block 720, AZC 116 selects top ranking server computers in the candidate server computer list and sends requests to compute agents 314 (FIG. 3) on them to spawn VMs with the VC software (image) on them. Block 720 may be followed by block 722.

In block 722, compute agents 314 on the selected server computers receives the request and spawn new VMs. Block 722 may be followed by block 724.

In block 724, compute agent 314 determines if VMs are spawn successfully. If no, then block 724 may be followed by block 726. Otherwise block 724 may be followed by block 728.

In block 726, AZC 116 determines an error has occurred in spawning the VMs. AZC 116 may cause web server 118 to send an error message to customer computer 112 and end method 700.

In block 728, VCs start on the VMs and retrieve VPSA and VC information from AZC 116, which ends method 700. Information retrieved from AZC 116 includes VPSA info (name and ID), VC info (each VC has a unique instance ID within AZ), networking info (MAC and IP addresses of the VCs and association of VNICs in the VMs to private and public networks), and credentials for authenticating I/O access to the VPSA. Such information may be needed for a VC to maintain persistent identification, setup its networking properly, and establish clustering handshake with one or more coupling VCs.

Various other adaptations and combinations of features of the embodiments disclosed are within the scope of the invention. Numerous embodiments are encompassed by the following claims.

The invention claimed is:

1. A method to provide virtual private storage array service over a computer network for cloud servers in a public or a private cloud, comprising:
   receiving parameters for a virtual private storage array over the computer network from a customer, the parameters for the virtual private storage array including a virtual controller hardware model for each virtual controller in the virtual private storage array, drive characteristics for the virtual private storage array, and a drive quantity for the virtual private storage array;
   creating the virtual private storage array for the customer from processor/memory complexes and physical drives available from server computers, comprising:
      creating virtual drives from a set of physical drives that meets or exceeds the drive characteristics and the drive quantity, each virtual drive being one entire selected physical drive; and
      allocating the virtual drives to the virtual private storage array;
   creating one or more volumes from the virtual drives;
   exposing the one or more volumes over the computer network to one or more cloud servers; and
   handling access requests to the exposed one or more volumes over the computer network from the one or more cloud servers, comprising using one or more private encryption keys of the customer, which are not shared with the virtual private storage service or other customers of the virtual private storage service, to encrypt and decrypt volume data on the one or more volumes.

2. The method of claim 1, wherein:
   each server computer runs software including at least one of a storage node and a compute agent; and
   said creating the virtual private storage array, said creating one or more volumes, said exposing the one or more volumes, and said handling access requests comprise:
      selecting the set of the physical drives that meets or exceeds the drive characteristics and the drive quantity, the selected physical drives being from a set of the server computers;
      instructing storage nodes on the set of the server computers to allocate the virtual drives to the virtual private storage array, the storage nodes being configured to:
         create the virtual drives from the selected physical drives, each virtual drive being a partition that is one entire selected physical drive; and
         expose the virtual drives to virtual controllers in the virtual private storage array;
      selecting a set of the processor/memory complexes that each meets or exceeds the virtual controller hardware model, the selected processor/memory complexes being from an other set of the server computers;
      instructing compute agents on the other set of the server computers to spawn virtual machines for the virtual controllers, the compute agents being configured to:
         spawn one virtual machine on at least part of each selected processor/memory complex dedicated to the virtual machine; and
      start one virtual controller per virtual machine so each virtual controller in the virtual private storage array runs on a different server computer, one or more of the virtual controllers being configured to:
         discover the exposed virtual drives;
         create one or more virtual pools comprising the exposed virtual drives;
         implement a data protection scheme on the one or more virtual pools;
         create the one or more volumes from the one or more virtual pools;
         expose the one or more volumes over the computer network to the one or more cloud servers; and
         handle access requests to the exposed one or more volumes over the computer network from the one or more cloud servers.

3. The method of claim 2, wherein:
   the storage nodes are further configured to:
      discover the physical drives;
      query the physical drives for drive types and drive capacities; and
      transmit the drive types and the drive capacities to an availability zone controller;
   said selecting the set of the physical drives comprises:
      creating a list of candidate server computers with physical drives meeting or exceeding the drive characteristics;
      sorting the list according to one or more sorting criteria; and
      selecting physical drives of top ranking candidate server computers.

4. The method of claim 2, wherein said selecting a set of the processor/memory complexes comprises:
   querying the server computers for the processor/memory complexes;
   creating a list of candidate server computers with processor/memory complexes meeting or exceeding the virtual controller hardware model;
   sorting the list according to one or more sorting criteria; and
   selecting processor/memory complexes of top ranking candidate server computers.

5. The method of claim 2, wherein the set of server computers includes part or all of the server computers.

6. The method of claim 2, wherein the set of the server computers and the other set of server computers overlap.

7. The method of claim 1, wherein said handling access requests includes authenticating the access requests to ensure data privacy.

8. The method of claim 1, wherein the parameters further include one of a RAID level of data protection for the virtual pool.

9. A method to provide a virtual private storage array to a customer as a service over a computer network, the method comprising:
   receiving parameters from the customer for the virtual private storage array over the computer network, the parameters for the virtual private storage array including a virtual controller hardware model for each virtual controller in the virtual private storage array, a RAID scheme for the virtual private storage array, drive characteristics for the virtual private storage array, and a drive quantity for the virtual private storage array; and creating the virtual private storage array from processor/memory complexes and physical drives available from server computers, each server computer running software including at least one of a storage node and a compute agent, said creating the virtual private storage array comprising:
  selecting a set of the physical drives that meets or exceeds the drive characteristics and the drive quantity, the selected physical drives being from a set of the server computers;
  instructing storage nodes on the set of the server computers to allocate virtual drives to the virtual private storage array, the storage nodes being configured to:
    create the virtual drives from the selected physical drives, each virtual drive being a partition that is one entire selected physical drive; and
    expose the virtual drives to virtual controllers in the virtual private storage array;
  selecting a set of the processor/memory complexes that each meets or exceeds the virtual controller hardware model, the selected processor/memory complexes being from an other set of the server computers;
  instructing compute agents on the other set of the server computers to spawn virtual machines for the virtual controllers, the compute agents being configured to:
    spawn one virtual machine on at least part of each selected processor/memory complex dedicated to the virtual machine; and
    start one virtual controller per virtual machine so each virtual controller in the virtual private storage array runs on a different server computer, one or more of the virtual controllers being configured to:
    discover the exposed virtual drives;
    create one or more virtual pools comprising the exposed virtual drives;
    implement the RAID scheme on the one or more virtual pools;
    create one or more volumes from the one or more virtual pools;
    expose the one or more volumes over the computer network to one or more customer computers; and
    handle access requests to the exposed one or more volumes over the computer network from the customer computer, comprising using one or more private encryption keys received from the customer, which are not shared with the virtual private storage service or other customers of the virtual private storage service, to encrypt and decrypt volume data on the one or more volumes.

10. The method of claim 9, further comprising:
transmitting a web form over the computer network, the web form being configured to pass back the parameters;
determining a service fee for the virtual private storage array;
transmitting a web page over the computer network, the web page including the service fee, the web page being configured to pass back a confirmation to create the virtual private storage array; and
receiving the confirmation over the computer network from the customer computer.

11. The method of claim 9, wherein:
the virtual controller hardware model specifies at least one of a central processing unit model, a central processing unit feature, a central processing unit quantity, a random access memory capacity, and a networking bandwidth; and
the drive characteristics specify at least one of a drive type, a drive capacity, and a drive encryption.

12. The method of claim 9, wherein:
each virtual drive is a logical volume created from a partition that is an entire physical drive; and
the storage nodes are configured to expose the virtual drives to the virtual controllers by exposing the virtual drives as network block devices to the virtual controllers.

13. The method of claim 9, wherein the parameters further include a virtual controller quantity in the virtual private storage array.

14. The method of claim 9, wherein:
the storage nodes are further configured to:
  discover the physical drives;
  query the physical drives for drive types and drive capacities; and
  transmit the drive types and the drive capacities to an availability zone controller;
said selecting a set of the physical drives comprises:
  creating a list of candidate server computers with physical drives meeting or exceeding the drive characteristics;
  sorting the list according to one or more sorting criteria; and
  selecting physical drives of top ranking candidate server computers.

15. The method of claim 14, wherein the one or more sorting criteria include utilization rates of the candidate server computers.

16. The method of claim 9, wherein said selecting a set of the processor/memory complexes comprises:
querying the server computers for the processor/memory complexes;
creating a list of candidate server computers with processor/memory complexes meeting or exceeding the virtual controller hardware model;
sorting the list according to one or more sorting criteria; and
selecting processor/memory complexes of top ranking candidate server computers.

17. The method of claim 16, wherein the one or more sorting criteria include utilization rates of the candidate server computers.

18. The method of claim 9, wherein the virtual controllers are configured for load-sharing and redundancy.

19. The method of claim 9, wherein the set of server computers includes part or all of the server computers.

20. The method of claim 9, wherein the set of the server computers and the other set of server computers overlap.

21. The method of claim 9, wherein the physical drives include one or more of magnetic hard disk drives, solid state drives, and phase-change memory drives.

* * * * *